United States Patent [19]

Ruhl

[11] Patent Number: 4,656,488
[45] Date of Patent: Apr. 7, 1987

[54] TRANSPORTATION EQUIPMENT RECORDER WITH TIME ACCURACY

[76] Inventor: Hermann Ruhl, 133 Richmond Street West, Toronto, Ontario, Canada, M5H 2L7

[21] Appl. No.: 779,038

[22] Filed: Sep. 23, 1985

Related U.S. Application Data

[63] Continuation of Ser. No. 486,207, Apr. 18, 1983, abandoned, and Ser. No. 486,388, Apr. 19, 1983, abandoned.

[30] Foreign Application Priority Data

Apr. 22, 1982 [CA] Canada .................................. 401495

[51] Int. Cl.⁴ ............................................. G01D 15/00
[52] U.S. Cl. .................................... 346/49; 346/33 D
[58] Field of Search ..................... 346/136, 23, 20, 49, 346/33 D, 18; 434/65; 73/128, 129

[56] References Cited

U.S. PATENT DOCUMENTS 3,453,645  7/1969  Franklin et al. ...................... 346/49
3,748,868  7/1973  Lutz et al. ........................... 346/23
4,358,272  11/1982 Gurther ................................ 346/49

Primary Examiner—Arthur G. Evans

[57] ABSTRACT

The present invention provides a system for recording operating condition information regarding transportation equipment and for determining the accuracy of recorded duration of the operating conditions. The system includes a first recording member for recording the operating condition information and a second recording member for recording time information in a predetermined pattern with accurate duration recording of the operating condition information and where such predetermined pattern is broken with inaccurate duration recording of the operating condition information.

10 Claims, 3 Drawing Figures

| EVENT | PRINTED TIME SCALE SHOWS | | TRUE CLOCK TIMES SHOWN BY ABSOLUTE TIME SCALE | | | ELAPSED TIME DIFFERENCE FROM WORK START | ABSOLUTE TIME DIFFERENCE FROM WORK START |
|---|---|---|---|---|---|---|---|
| | CLOCK TIME | TIME SPAN | ELAPSED TIME FROM WORK START | CLOCK TIME | TIME SPAN | ELAPSED TIME FROM WORK START | | |
| WORK START | 9:55 | — | — | 11:00 | — | — | — | — |
| STOP A | 10:40 – 12:00 | 1:20 | 2:05 | 11:45 – 11:55 | 0:05 | 0:55 | + 1:15 | − 1:05 |
| STOP B | 12:07 – 13:23 | 1:16 | 3:28 | 12:02 – 12:18 | 0:16 | 0:18 | + 2:10 | + 0:05 |
| STOP C | 14:57 – 15:35 | 0:38 | 5:40 | 13:52 – 15:00 | 1:08 | 4:00 | + 1:40 | + 1:05 |
| WORK END | 18:40 | — | 8:45 | 18:05 | — | 7:05 | + 1:40 | + 0:35 |

FIG. 3.

TRANSPORTATION EQUIPMENT RECORDER WITH TIME ACCURACY

This is a continuation of application Ser. No. 06/486,207, filed 4/18/83, and Ser. No. 06/486,388, filed 4/19/83, now both abandoned.

FIELD OF THE INVENTION

The present invention relates to a system for recording operating condition information relating to transportation equipment. The system includes an accuracy check for determining the accuracy of the duration over which such recordings were made.

BACKGROUND OF THE INVENTION

Transportation equipment such as trucks, cars, boats and the like are operated by a driver or an operating crew for extended periods of time without direct supervision. Accordingly it is common to install recording devices on these vehicles for supplying visible recordings of the various operating parameters such as driving speed, motor rpm and on/off conditions for brakes, heaters, power takeoff, etc. The recordings are usually made by stylii which record the parameters such as driving speed or engine rpm on a recording receiving medium which is generally in the form of a circular disk or a paper tape. The recording medium is moved by a clock mechanism with constant speed and will usually include a network imprint such as a network of scales having time markings which move in the direction of movement of the recording medium. The time markings are arranged for recording of the parameters by the stylii at the correct time of their occurrences and in order to meet this requirement the recording medium must be inserted in the recording device such that the recordings start with insertion of the recording medium at the correct preprinted time markings of the scale. Since the recording medium and the drive system are often designed in a manner such that the recording medium can only be inserted when the drive system is in a certain position it is necessary to provide an adjustment system which allows adjustment of the relative positions of the recording medium and the stylii.

This adjustment system is accessible to any personnel who have to tend to the recorder for inserting and removing the recording medium which leads to the possibility of the operating personnel manipulating the position of the recording medium. These personnel can, therefore, falsify the recordings by recording inaccurate times in which the conditions occur and/or by recording prolonged and shortened time periods for the conditions.

SUMMARY OF THE PRESENT INVENTION

The present invention provides a system for recording operating condition information regarding transportation equipment and for determining accuracy of the recorded duration of such conditions. The system comprises first recording means for recording the information on a recording receiving medium, timing means for moving the receiving medium relative to the first recording means, second recording means independent of the first recording means for recording absolute duration information on the receiving medium and control means for operating the second recording means such that the absolute duration information is recorded on the receiving medium in a predetermined pattern if there is accurate duration recording of the operating condition information. This pattern is broken if there is inaccurate duration recording of the operating condition information.

In most applications the system further includes adjustment means for positional adjustment of the receiving medium relative to the first recording means to enable time correct initiation of the system. The second recording means is additionally independent of this adjustment means.

According to an aspect of the present invention the timing means comprises first and second timing mechanisms independent of one another with the second recording means being operated by the second timing mechanism.

BRIEF DISCUSSION OF THE DRAWINGS

The above as well as other advantages and features of the present invention will be described in greater detail according to the preferred embodiments of the present invention in which:

FIG. 3 is a chart showing discrepancies between recorded and actual times of operating condition information.

DETAILED DESCRIPTION ACCORDING TO THE PREFERRED EMBODIMENTS OF THE PRESENT INVENTION

Figure 2:
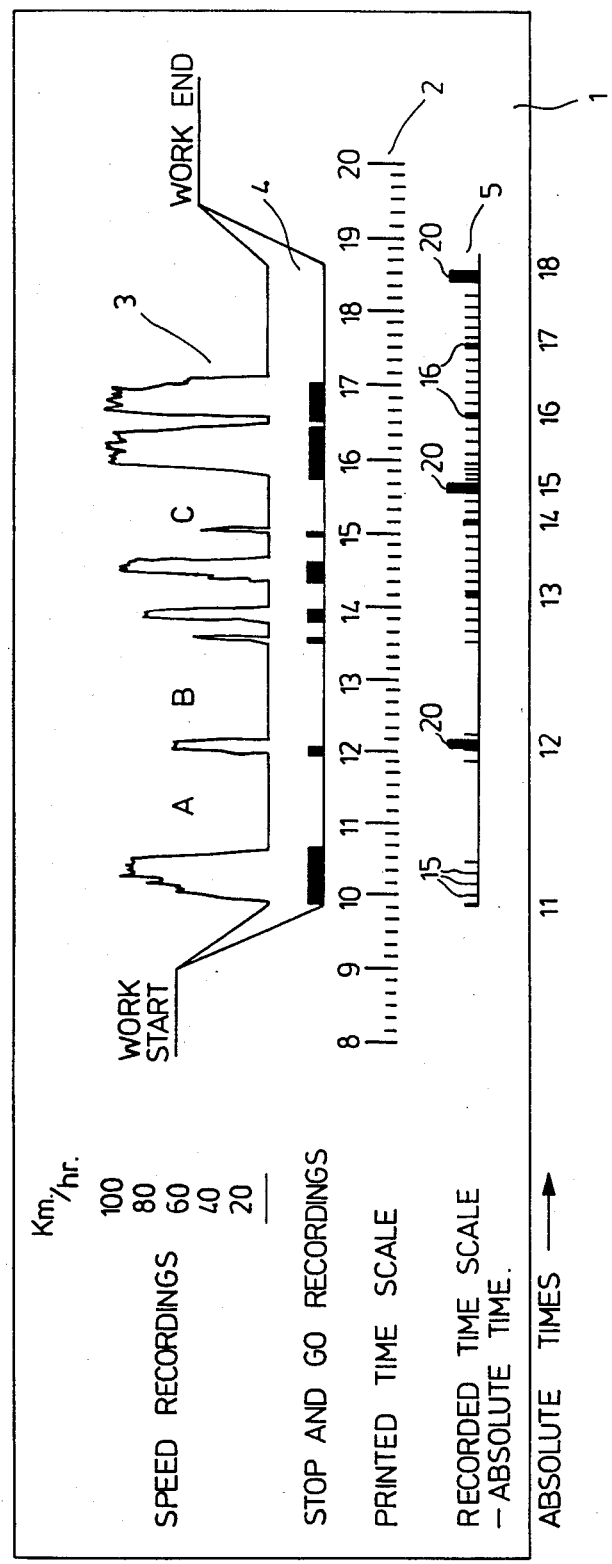
FIG. 2 is a plan view of a typical recording medium used for receiving the recordings made from the system of FIG. 1.

A standard tachograph unit which is not shown in the drawings comprises one or more recording stylus for producing a graphic illustration of operating condition information as found in the upper portion of FIG. 2. This illustration appears on a recording medium such as a circular chart or an elongated tape which is moved by a clock mechanism of the tachograph.

According to the present invention a totally separate stylus is used to record time information which is used to determine the accuracy for the recorded duration of the operating condition information.

The stylus which is used to record the time information is operated by a timing pulse system to move to and from a recording position with respect to the same recording medium on which the operating information is recorded. The timing pulse operated stylus may be set up to move to the recording position at regular time intervals to produce time markings at those intervals and to thereafter move away from the recording position. However, this timing pulse operated stylus may also be set up such that it is normally in the recording position and to move away from the recording position at such regular time intervals and according to either of these embodiments the time information recording stylus will produce a pattern of markings which is in a preset sequence assuming the recording medium is moved at a constant speed indicative of accurate recordings. If however the recording medium is not moved with constant speed which would indicate inaccurate recording of the operating condition information as for instance by unauthorized adjustment of the recording medium then the time information markings will not appear in their preset sequence.

An example of a system as described above is one in which the time pulse operated stylus is set up to record regularly spaced time markings on the recording medium. This is achieved by connecting this particular stylus with the timing mechanism or clock required to drive the recording medium such that at regular fixed time intervals a pulse is directed to the information recording stylus which causes the stylus to produce visible regularly spaced markings on the recording medium. If the operator of the vehicle then adjusts the recording medium to move ahead in time or forward in position in a manner irregular to and faster than the standard forward speed imparted by the clock, there would be an increased spacing between the time markings compared to the spacing produced without tampering of the adjustment and normal operation of the clock. The increase in the spacing is a direct measure of the amount of time that the recording medium has been moved ahead.

In the event that the recording medium is temporarily stopped or moved backward in time then the distance between the time markings would be shortened. If the recording medium were actually moved backwards then markings would be produced between already existing markings. Accordingly, regardless of the type of manipulation made to the recording medium through the adjustment system there would be an indication of such manipulation in the time information recordings by increased, decreased or overlapping spacing of the time markings.

As mentioned above the timing pulse system for operating the time information recording stylus may be run off the same clock mechanism as is used to drive the recording medium. It may also be driven off a second timing mechanism independent of the clock used to drive the recording medium. This second timing mechanism or clock may have its own power source which cannot be disconnected or adjusted by opening the recorder for insertion, removal or adjustment of the recording medium and needs only enough power to control the time information recording stylus. In this case it can be operated by a very small battery which may operate for periods of up to two years requiring infrequent replacement.

This second independent by powered timing mechanism provides the added benefit that the time information stylus will continue to record in the event that the power supply to the first clock is disconnected by the equipment operator specifically for the purpose of discontinuing recording of the time information.

Figure 1:
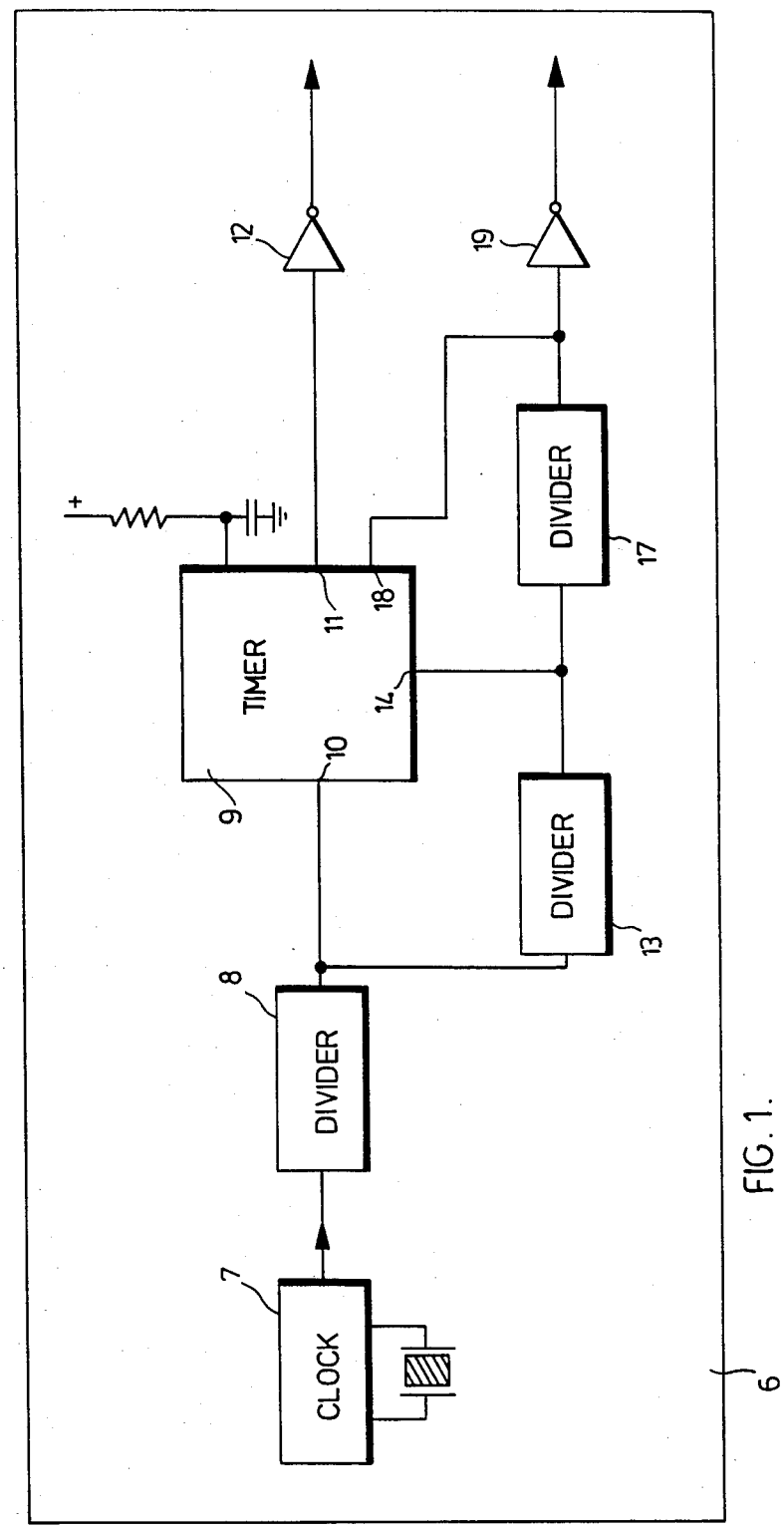
FIG. 1 is a schematic view of an electrical circuit for operating the system according to a preferred embodiment of the present invention.

The use of an independent timing mechanism for the time information stylus also allows the use of an improved accuracy control in which the time markings are recorded in a manner indicative of accurate absolute time on the recording medium. Such an arrangement is shown in FIG. 1 with the results of the arrangement being shown in the lower scale of FIG. 2 where the time stylus is operated by its timing pulse system to produce a short thin line for every ten minute interval, a short thick line for every hour interval and a tall thick line for every three hour interval. These different markings which are all distinct from one another are produced in accordance with the length and type of pulse sent to the time information stylus by the second timing mechanism.

The advantage of having a marking system which can be read for absolute time and recorded by a single stylus lies in the ease of determining where the recording medium has been adjusted for correct time recordings and for determining whether the recording medium has been inserted properly into the recorder for such recordings.

Such an absolute time marking system would allow the use of a recording medium which does not have preprinted time scale as the time scale is actually created by the pattern produced by the second stylus.

Referring more specifically to the Figures, a paper tape 1 shown at FIG. 2 is transported by the clock mechanism of the tachograph. This paper tape has an imprinted time scale 2 with the recorder being equipped with three different stylii including a speed stylus for recording the vehicle's speed in km/hr and recording a speed trace 3, a stop and go stylus which records a stop and go trace 4 and a time recording stylus which records time markings 5. The time stylus is controlled by an electronic control board 6 which is shown in FIG. 1.

The control board includes a quartz clock 7 driven by its own battery power supply providing output pulses at the frequency of one pulse per minute. A first pulse divider 8 having a ratio of 1 to 10 provides an output pulse every ten minutes. The pulse is from pulse divider 8 trigger a timer 9 at its input 10. Each of the pulses at input 10 to the timer sets the timer for a duration of 20 seconds so that a 20 second pulse is sent out by the timer by connecting point 11 through diode 12 to the input connecting point for low level recording of the time stylus on the recorder.

The ten minute timing pulses from pulse divider 8 are also directed to a pulse divider 13 which provides an output pulse for every six input pulses. Pulse divider 13 therefore provides its own pulse every hour. Each of the pulses from divider 13 is connected to the input 14 of timer 9 which causes an output pulse at point 11 having a duration of one minute. This output pulse is also connected via diode 12 to the low level recording input of the time stylus.

The timing stylus of the recorder is designed in a fashion such that it performs a short stroke regularly in repeating motion when it receives a pulse from the low level input point and a long stroke motion when it receives a pulse from the high level recording input point.

The regular ten minute pulse from time 9 results in low level recording marks of 20 second duration shown at 15 on the recording tape and in heavier recordings of one minute duration for each full hour as indicated at 16 on the same recording tape.

The hourly output pulse of divider 16 is also connected to a divider 17 which provides an output pulse for every three hours to the input 18 of timer 9. Timer 9 then maintains the pulse on point 18 for a period of two minutes. Timer 17 and point 18 of timer 9 send this two minute pulse every three hours via diode 19 to the high level connecting point for the timing stylus. This causes the timing stylus to record a high level recording for two minutes at every three hour interval indicated at 20 on tape 1.

To facilitate reading of the recorded time schedule the actual absolute times are recorded correctly on the time scale 5 as shown in FIG. 2. It is therefore apparent from a comparison between the recorded time scale 5 and the printed time scale 2 that there are considerable discrepancies in the recordings of FIG. 2. These discrepancies point out manipulations of the markings made on the recording time scale therefore drawing attention to irregularities and false time recordings.

In the example shown in FIG. 2 the trace recordings indicate that the recording tape was inserted when tracings 3 and 4 begin on the tape with this point being called the work start. The end of tracings 3 and 4 are referred to as work end. According to FIG. 2 it is shown on time scale 5 that the work start actually takes place at 11:00. The recording tape has however been inserted such that the work start on the printed time scale appears to be 9:55 which is one hour and five minutes later than what is indicated on the printed time scale.

According to the trace recordings on the printed time scale the work end finishes at 18:40. However, according to the aboslute time clock of time scale 5 the work end actually occurs at 18:05 indicating a discrepancy of 35 minutes where the actual work end is earlier than the recorded work end.

FIG. 2 is also used to show three manipulations of the recording stylus which have occurred during stoppage of the vehicle at periods A, B and C. These manipulations can be better described having reference to FIG. 3.

The trace recordings on tape 1 indicate that the vehicle started to move at 9:55 and stopped at 10:40 for stop A. Stop A then extends to 12:00 on the printed time scale showing a stoppage period of one hour and twenty minutes and the total elapsed time from work start to the end of stoppage A of two hours and five minutes. However, in reviewing the absolute time of scale 5, the work start actually occurred at 11:00 and the vehicle was stopped at 11:45. Thereafter there is a considerable blank space where the clock has been moved ahead at which point the recordings on scale 5 reappear at 11:55. Therefore the actual end of stop A occurs at 11:55 so that the vehicle was in fact only stopped for ten minutes. Therefore during these ten minutes the recording tape 1 was moved ahead by the operator a total time of one hour and ten minutes as shown in the elapsed time difference column. The absolute time difference at this point between the time shown on the printed time scale and the absolute time scale is 5 minutes with the printed time scale being the more advanced of the two times.

The next difference becomes apparent during stop B where according to the printed time scale this stop extended from 12:07 to 13:23 lasting therefore one hour and 16 minutes. The total elapsed time from work start to the end of stop B is three hours and 28 minutes according to the printed time scale. However, in reviewing the absolute time scale a time marking occurs at 12 hours and two minutes where the blank space appearing thereafter indicates once again a manipulation of the time recording. The next recording on the absolute time scale appears at 12 hours and 18 minutes so that the actual stoppage for period B was only sixteen minutes rather than the one hour and sixteen minutes as indicated by the trace recordings. Furthermore the actual total elapsed time from work start to the end of stoppage B is two hours and ten minutes rather than the three hours and 28 minutes referred to above.

Irregularities also appear during stop C. Printed time scale indicates stop C begins at 14:57 and lasts until 15:35, a total time of 38 minutes. However, according to the recorded aboslute time, stop C really started at 13:52 and continued until 15:00 with the chart having being moved backwards such that the stop appears to be much shorter than it acutally was. This is indicated by a full hour recording for 15:00 i.e., the thickened line recording, being spaced between the regular 10 minute recordings out of its regular pattern. It can therefore be determined that since the vehicle really started to move at 15:00 the absolute time span for stop C is one hour and 18 minutes compared to the 38 minutes showing on the trace recordings of the time scale.

From the above it will be seen that the extent of the manipulation can be determined by comparing the absolute time scale with the printed time scale. However, in addition without looking into exact details, it becomes apparent that during stops A, B and C some type of manipulations have been made as shown by the irregular time pattern where the time markings are out of their normal sequence. Therefore it is easily determined that no manipulations have been made when the markings appear in their regular pattern.

While the examples shown on recording tape 1 is based on the principle of using an absolute time clock operated independently from the clock or timing mechanism for the tape it is also to be appreciated that the simple adding of regular time markings originating from the same time clock used to drive the paper tape will produce regular time markings with non-manipulated use of the recorder and irregular time markings if the paper tape is moved forwardly or backwardly in time after the insertion of the tape in the recorder. However, this only applies in cases where the actual clock mechanism is not disconnected. Therefore unfortunately irregularities cannot be marked in cases where the clock is accessible and may be disconnected to stop the clock which would also stop the time markings. This is not a problem when using the independent clock system as described above, nor is it a problem when the clock mechanism for the recorder is not accessible to the driver so that both alternatives are applicable to the present invention.

If an independent clock is used with its own power source to supply the absolute time marking it is possible by varying the setting of the time control board to indicate any desired absolute time on the chart. For example, the setting may be varied to send pulses characteristic for different time markings such as one duration of pulse to produce a time marking for every half hour and different durations of pulses to produce different time markings for every full hour, every three hour period or every 24 hour period to obtain characteristic easy to ready markings on the time scale. This may also be achieved by varying the height of the time markings as described above.

Although various preferred embodiments of the inventon have been described herein in detail it will be appreciated by those skilled in the art that variations may be made thereto without departing from the spirit of the invention or the scope of the appended claims.

The embodiments of the invention in which an exclusive property or privilege is claimed are defined as follows:

1. A system for recording information regarding transportation equipment operating conditions and for determining accuracy of the recorded as opposed to actual duration of such operating conditions, said system comprising first recording means for recording the information on a recording receiving medium, clock means for moving the receiving medium relative to said first recording means, second recording means independent of said first recording means for recording time information on the receiving medium, and control means for controlling said second recording means to record in a predetermined pattern indicative of accurate recording of the duration of the operating condition information and for controlling said second recording means to produce recordings other than in such predetermined pattern when inaccurate recording of the duration of the operating condition information occurs thereby highlighting any such inaccurate time recording.

2. A system as claimed in claim 1 including adjustment means for positional adjustment of the receiving medium relative to said first recording means to enable time correct initiation of said system.

3. A system as claimed in claim 1 wherein said control means comprises a timing pulse system for operating said second recording means to move to and from different recording positions with respect to the receiving medium.

4. A system as claimed in claim 2 wherein said timing pulse system operates said second recording means to move to and from different recording positions at regular time intervals to produce time markings during such regular time intervals.

5. A system as claimed in claim 3 wherein said second recording means is normally in the recording position and said timing pulse system operates said second recording means to move away from the recording position at regular time intervals.

6. A system as claimed in claim 3 wherein said timing pulse system is operated to pulse from said timing means independently of any adjustment of the recording receiving medium.

7. A system as claimed in claim 6 wherein said timing means comprises a common clock for moving the recording receiving medium and for operating said timing pulse system.

8. A system as claimed in claim 6 including independent timing means for operating said control means independently of said clock means.

9. A system as claimed in claim 8 wherein said independent timing means is powered independently of said clock means for continued operation of said timing pulse system in the event of disconnection on said clock means.

10. A system as claimed in claim 8 wherein said second recording means is operated by said timing pulse system to produce identifiable time markings on the recording receiving medium at preset time intervals and wherein said control means includes a pulse control providing distinctly different pulses after a given number of such preset time intervals such that the time markings are produced by said second recording in a pattern having distinctive markings for different periods of time.

* * * * *